J. H. FITCH.
MOTOR VEHICLE.
APPLICATION FILED FEB. 2, 1914.

1,114,245.

Patented Oct. 20, 1914.
3 SHEETS—SHEET 3.

Witnesses:

Inventor:
John H. Fitch
By Peirce, Fisher & Clapp
Attys.

UNITED STATES PATENT OFFICE.

JOHN H. FITCH, OF LUDINGTON, MICHIGAN.

MOTOR-VEHICLE.

1,114,245.   Specification of Letters Patent.   Patented Oct. 20, 1914.

Application filed February 2, 1914. Serial No. 816,103.

*To all whom it may concern:*

Be it known that I, JOHN H. FITCH, a citizen of the United States, and a resident of Ludington, county of Mason, and State of Michigan, have invented certain new and useful Improvements in Motor-Vehicles, of which the following is a full, clear, and exact description.

The invention relates to motor vehicles and seeks to provide new and improved mechanism for driving all four wheels of the vehicle, so that the latter is better adapted for rough roads.

A further object is to provide gearing for driving all four wheels which will permit the steering movement of the front axle.

The invention consists in the features of improvement hereinafter set forth, illustrated in the preferred form in the accompanying drawings and more particularly pointed out in the appended claims.

Figure 1:
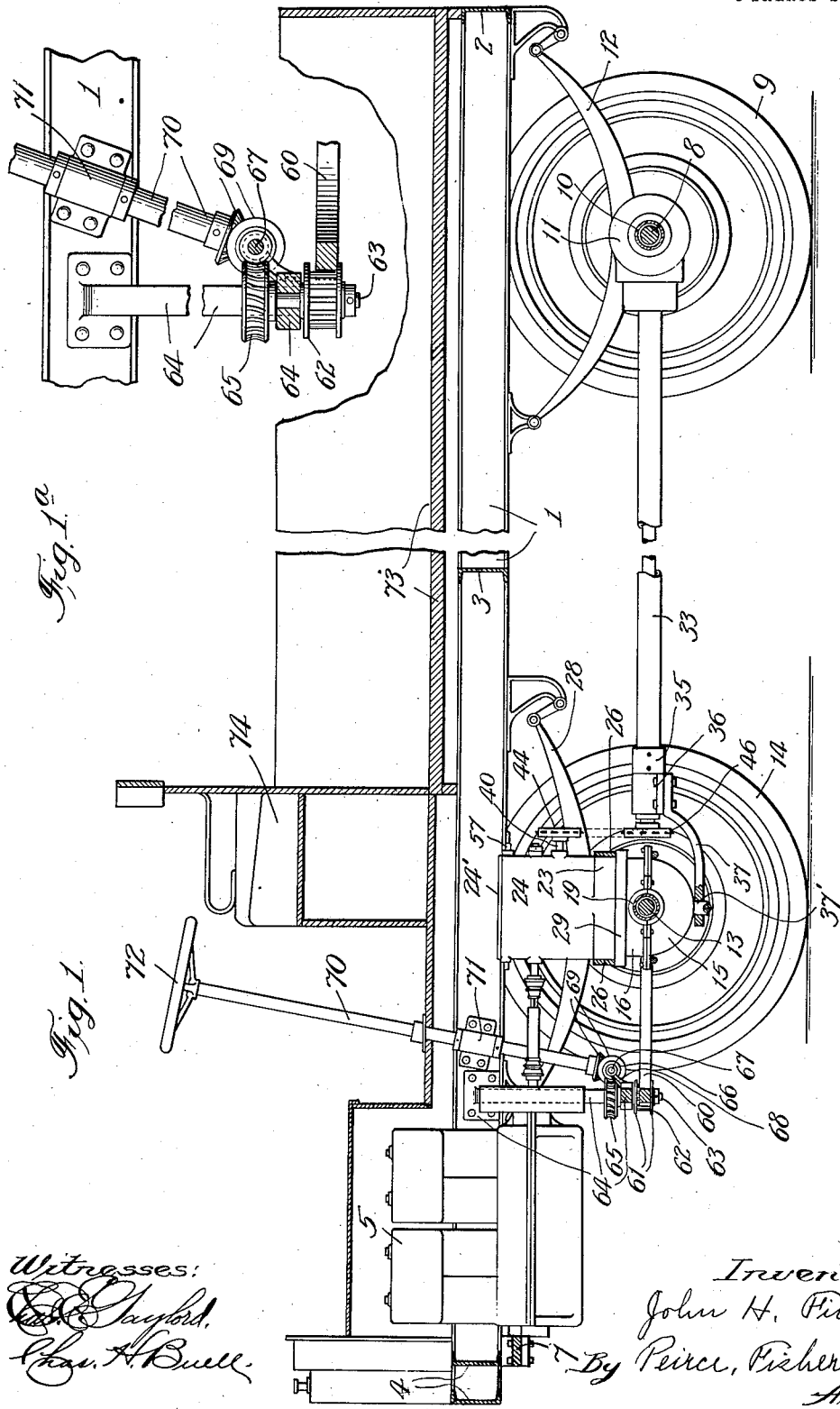
Figure 2:
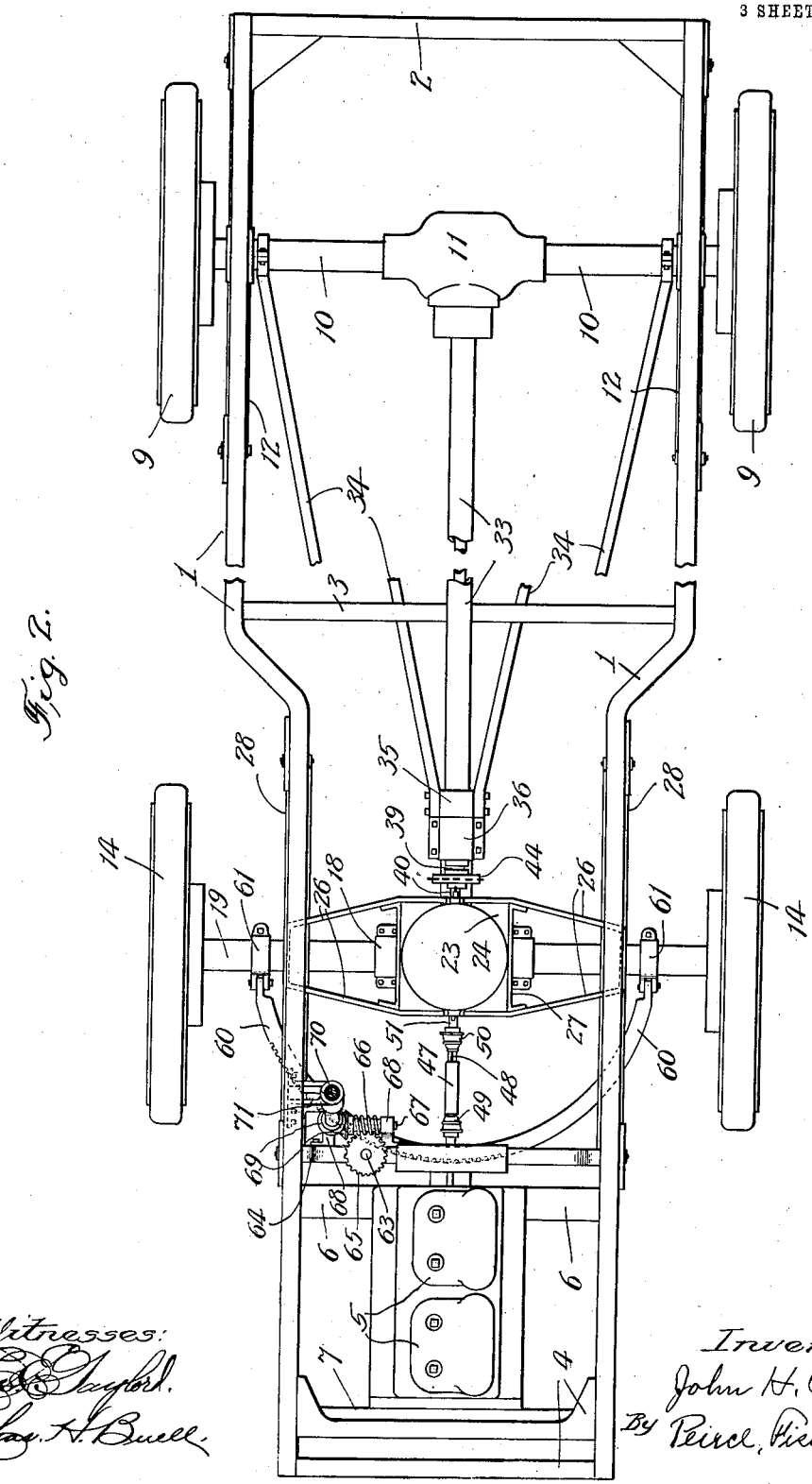
Figure 3:
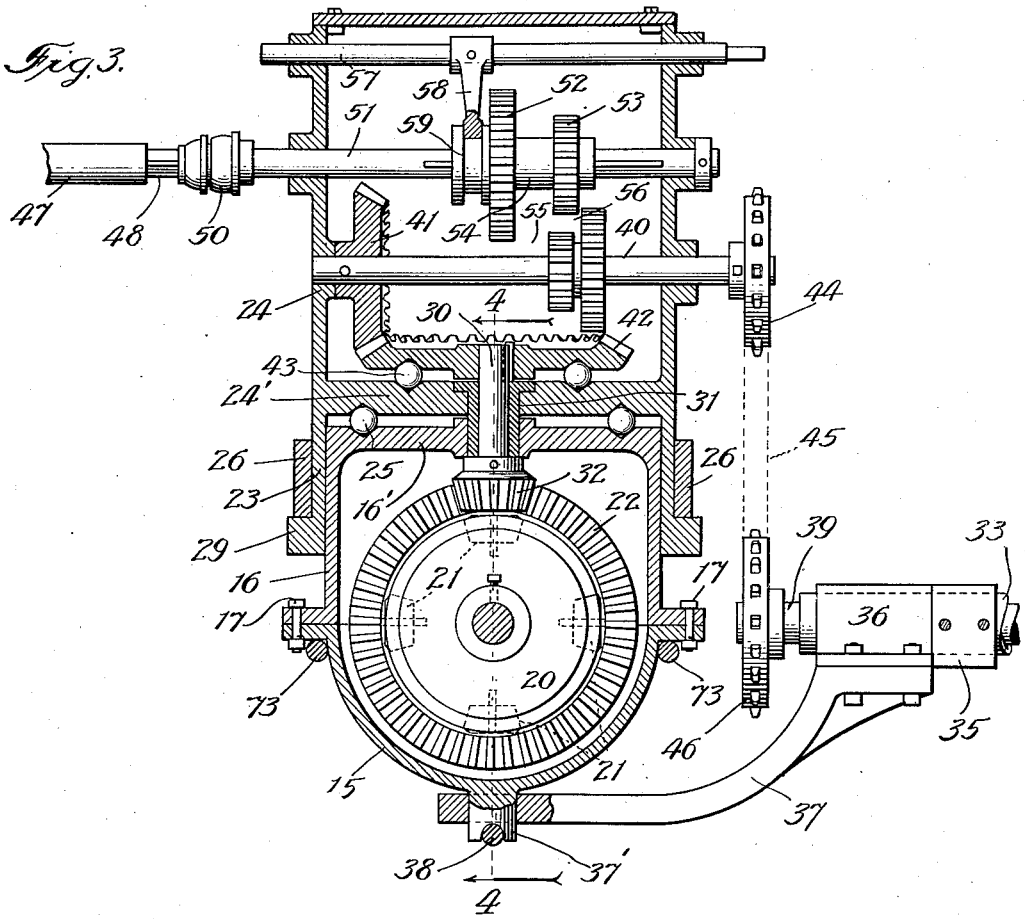
Figure 4:
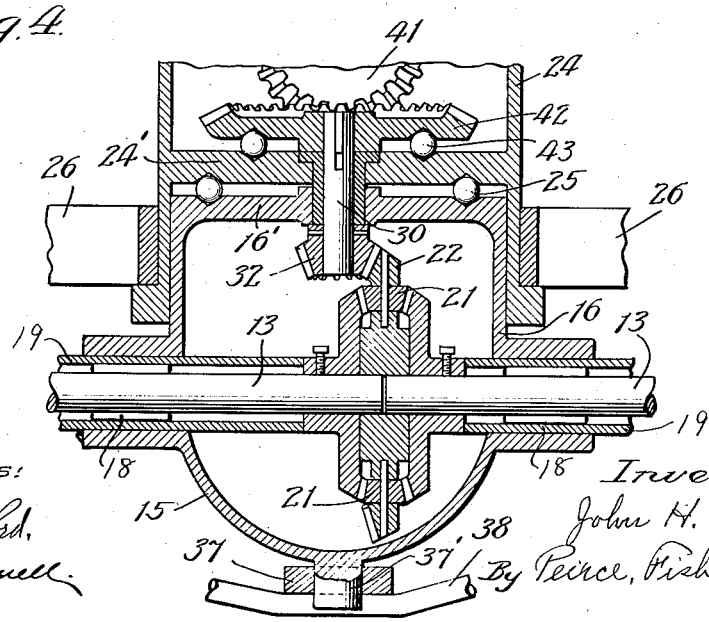

Figure 1 is a view in vertical section of the improved motor vehicle. Fig. 1ª is a detail view showing a sectional elevation of the steering mechanism. Fig. 2 is a plan view of the frame and drive mechanism. Fig. 3 is a vertical longitudinal section of the transmission gearing. Fig. 4 is a section on the line 4—4 of Fig. 3.

The invention is shown as applied to a motor truck for which the improved drive mechanism is particularly applicable. The frame comprises side sills 1 which are preferably offset intermediate their ends so that the front portions of the sills are nearer together than their rear portions. The rear portions are connected by transverse members 2 and 3. The extreme front portions are connected by transverse members 4. The sills and transverse connecting members are preferably formed of channel bars. The motor 5 is provided with suitable laterally projecting portions 6 and 7 by which the motor is supported from the front ends of the sills.

The rear axle 8 is of usual construction. It is provided on its ends with traction wheels 9 and is journaled in suitable sleeves 10 which are fixed at their inner ends to a differential gear casing 11. The ends of the rear axle sleeve 10 carry elliptical or other suitable supporting springs 12, the upper portions of which are connected to the side sills 1, as shown in Fig. 1, or in any other suitable manner. The rear axle is divided, as usual, and is provided with suitable differential mechanism for driving the axle sections and the rear traction wheels 9. The front axle 13 is also divided into sections and is provided with traction wheels 14. The axle sections are journaled at their inner ends in a suitable casing. This casing, as most clearly shown in Figs. 3 and 4, comprises a lower, semi-spherical portion 15 and an upper cylindrical portion 16, the flanged abutting edges of the upper and lower portions being connected by bolts 17. The sections of the front axle are journaled in suitable bearings 18 formed in the upper and lower sections of the gear casing and preferably, also, sleeves 19 project laterally from the bearings 18 and inclose the shaft sections. Suitable differential mechanism is arranged within the casing for driving the shaft sections. The construction shown is of ordinary type and comprises two beveled gears 20 fixed to the inner ends of the shaft sections and meshing with a series of beveled pinions 21 carried by a large beveled gear 22 that is loosely mounted upon the inner adjacent ends of the two shaft sections.

The upper cylindrical portion 16 of the casing on the front axle forms an enlarged king pin or fifth wheel to permit the swiveling or steering movement of the front axle. For this purpose, the upper cylindrical portion of the casing is vertically swiveled within a suitable cylindrical chamber formed in the lower bearing portion 23 of a suitable support. The support shown is preferably in the form of a gear box 24 within which the transmission gearing is arranged. Preferably, as shown, a series of bearing balls 25 are arranged in suitable race-ways in the top walls 16' of the gear casing on the front axle, and the bottom wall 24' of the gear box. As shown, the bearing portion 23 of the gear box extends below its bottom wall 24' and forms an enlarged bearing wherein the gear casing on the front axle is vertically swiveled.

Supporting springs are interposed between the gear box or support 24 and the front part of the frame. In the preferred construction shown, laterally projecting arms or bars 26 are secured to the lower bearing portion 23 of the gear box. The outer periphery of this lower portion is preferably rectangular, as shown, and is suitably secured to the bars 26 and to connecting bars 27 that extend between the bars 26. The outer ends of the laterally projecting bars 26 are connected to and support elliptical or other suitable springs 28, the upper portions of which are connected to the sills 1 of the frame. In the construction set forth, the gear box is carried upon the front axle and it, in turn, through the medium of the laterally projecting arms 26, carries the front end of the frame through the medium of the springs 28. To further strengthen the connection, the lower end of the bearing portion 23 of the gear box is provided with flanges 29 which project beneath the bars 26, as most clearly shown in Fig. 3.

A short vertical drive shaft 30 for the front axle extends through the top wall 16' of the gear casing and through the bottom wall 24' of the gear box and is journaled in a suitable bushing 31. This bushing fits tightly in the bottom wall 24' of the gear box and loosely in the top wall 16' of the gear casing. The gear box, as usual, is filled with oil, but any oil leaking therethrough will pass down around the shaft 30 into the differential gear casing on the front axle to lubricate the differential mechanism and the front axle bearings. In this way, the lubricant is economically used. The lower end of the vertical drive shaft is provided with a beveled pinion 32 which engages the large beveled gear 22 of the differential mechanism.

A reach connects the front and rear axles. In the preferred form shown, the reach comprises a sleeve 33 connected to the gear casing 11 of the rear axle and two inclined braces 34 connected at their rear ends to the outer ends of the sleeves 10 of the rear axle and at their forward ends to a collar 35 on the front end of the sleeve 33. The forward end of the sleeve 33 is journaled in a long bearing 36 which is mounted on the rear end of a bracket 37. This bracket extends downwardly and forwardly and its forward end pivotally engages a stud 37' on the lower central portion of the casing section 15.

A tension brace 38 is connected to the ends of the bearing sleeves 19 of the front axle and its central portion engages a notch in the lower end of the stud 38 below the front end of the bracket or arm 37, so that the latter and the front end of the reach are thereby upheld. A horizontal, longitudinal shaft 39 for driving the rear axle is suitably journaled in the sleeve 33 of the reach and its rear end is connected through the medium of suitable differential mechanism to the sections of the rear axle.

A short horizontal counter shaft is journaled in the gear box and suitable gearing is provided for connecting this counter shaft to the front axle drive shaft 30 and the rear axle drive shaft 39. In the preferred form shown, the counter shaft 40 is connected to the short, vertical, front axle drive shaft 30 by beveled gears 41 and 42. The beveled gear 42 is fixed to the upper end of the short vertical shaft 30 and preferably, as shown, a row of bearing balls 43 is arranged in suitable race-ways formed in the under surface of the gear and the upper surface of the bottom wall 24' of the gear box. The rear end of the counter shaft 40 extends outside of the gear box and is provided with a sprocket wheel 44 and a chain 45 connects this sprocket wheel with a sprocket wheel 46 on the front end of the rear axle drive shaft 39. The traction wheels of both the front and rear axles are preferably of the same size and the ratio of the gears 41 and 42 which connect the counter shaft to the front axle drive shaft is the same as that between the sprocket wheels 44 and 46 that connect the counter shaft to the rear axle drive shaft 39. The differential mechanisms, which connect the drive shafts for the front and rear axles to the sections thereof, are preferably of similar constructions, so that by driving the counter shaft 40, all four traction wheels will be properly driven to propel the vehicle. At the same time, the front axle is free to swivel within the lower portion of the gear box to effect the steering of the vehicle.

The counter shaft 40 is driven from the motor through the medium of a flexible shaft and through transmission gearing of any suitable form. In the construction shown, the flexible shaft comprises telescoping sections 47 and 48. The section 47 is connected by a universal coupling 49 to the shaft of the motor 5, and the section 48 is connected by a coupling 50 to a second horizontal counter shaft 51 journaled in the gear box 24. The transmission gearing shown comprises two gears 52 and 53 which are mounted on the shaft 51 and connected for simultaneous shift thereon by a sleeve 54. These gears differ in size and are arranged to engage, respectively, with a pair of gears 55 and 56 fixed to the counter shaft 40. The movement of the gears 52 and 53 is controlled by a rod 57 mounted to slide through bearings in the upper portion of the gear box and having a fork 58 thereon arranged to engage a grooved hub 59 that is fixed to the gear 52. Any other suitable transmission gearing may be employed and any suitable means can be provided for reversing the direction of motion of the driven shafts.

Suitable means are provided for steering the front axle. In the construction shown, a segmental rack bar 60 is pivotally connected at its ends to clamps 61 on the sleeves 19 of the front axle. The front portion of this rack bar, as most clearly shown in Fig. 1ª, engages the teeth of a pinion 62, which is flanged, so that the rack bar will move up and down with the pinion and be maintained in mesh therewith. This pinion is mounted upon the lower end of a short vertical shaft 63 which is journaled in the lower portion of a U-shaped support 64, the upwardly projecting ends of which are secured to the side sills 1. A worm wheel 65 upon the upper end of the shaft 63 is engaged by a worm 66 on a short, horizontal shaft 67. This shaft is journaled in suitable bearings 68 on the support 64, and is connected by a pair of beveled gears 69 to the lower end of a steering post 70. The steering post is journaled in a suitable bearing 71 on one of the side sills of the frame and at its upper end is provided with a hand wheel 72. In the construction shown, a truck body 73 and a rider's seat 74 is shown mounted upon the frame.

It is obvious that numerous changes may be made in the details set forth without departure from the essentials of the invention as defined in the claims.

I claim as my invention:—

1. In a motor vehicle, the combination with a frame, and a motor thereon, of front and rear axles provided with traction wheels, of differential mechanism and a casing therefor mounted upon said front axle, said casing having a cylindrical upper portion, a support wherein the cylindrical upper portion of said casing is vertically swiveled, supporting springs interposed between said rear axle and said frame and between said support and said frame, a short vertical shaft journaled in said support and extending into said casing in line with the axis thereof, a pinion on the lower end of said shaft for driving said differential mechanism, driving gearing mounted on said support and connected to the upper end of said vertical shaft, and a flexible shaft connecting said driving gearing to said motor, substantially as described.

2. In a motor vehicle, the combination of a frame, front and rear axles therefor, both provided with traction wheels, a motor mounted on said frame in advance of said front axle, a gear box mounted on said front axle and having a vertical swiveled connection therewith to permit the steering movement of said front axle, supporting springs interposed between said gear box and said frame, transmission gearing in said gear box, a flexible shaft connecting said transmission gearing to said motor and gears concentric with the vertical swiveled connection between said gear box and said front axle for connecting said transmission gearing to said axle, substantially as described.

3. In a motor vehicle, the combination with a frame, front and rear axles both provided with traction wheels, of a motor mounted on said frame in advance of said front axle, differential mechanism and a casing therefor mounted on said front axle, said casing having a cylindrical upper portion, a gear box mounted on said casing and having a lower bearing portion wherein said casing is vertically swiveled, supporting springs interposed between said gear box and said frame and between said rear axle and said frame, transmission gearing in said gear box, a flexible shaft connecting said transmission gearing to said motor, a short vertical shaft journaled in the lower portion of said gear box and in the upper portion of said casing in line with the vertical axis of the latter and beveled gears for respectively connecting the ends of said vertical shaft to said transmission gearing and to said differential mechanism, substantially as described.

4. In a motor vehicle, the combination of a frame, front and rear axles provided with traction wheels, a motor on said frame in advance of said front axle, differential mechanism and a casing therefor mounted on said front axle, said casing having an upper cylindrical portion, a gear box mounted on said casing and having a lower cylindrical bearing wherein the upper portion of said casing is vertically swiveled, a ball bearing interposed between the upper portion of said casing and the lower portion of said gear box, a short vertical shaft extending through the lower portion of said gear box and the upper portion of said casing in line with the vertical axis of the latter, beveled gearing connecting the lower end of said shaft to said differential mechanism, transmission gearing in said box connected to the upper end of said shaft, a flexible shaft connecting said transmission gearing to said motor, arms laterally projecting from said gear box, and supporting springs interposed between the ends of said arms of said frame, substantially as described.

5. In a motor vehicle, the combination with a frame, of a motor thereon and front and rear axles provided with traction wheels, a support wherein said front axle is vertically swiveled, springs interposed between said support and the frame and between said rear axle and the frame, a reach secured to said rear axle and pivotally connected at its forward end to said front axle, a longitudinal, horizontal shaft for driving said rear axle journaled in said reach, a short vertical shaft journaled in said support for driving said front axle, a horizontal counter shaft journaled in the support, gearing connecting said counter shaft to said short vertical shaft and said longitudinal shaft, and a flexible shaft connecting said counter shaft to said motor, substantially as described.

6. In a motor vehicle, the combination with a frame, of a motor mounted thereon, front and rear axles provided with traction wheels, a gear box mounted on said front axle and having a vertically swiveled connection therewith, a reach fixed to said rear axle and pivotally connected at its forward end to said front axle, a horizontal, rear axle drive shaft journaled in said reach, a short, vertical, front axle, drive shaft journaled in said gear box, a counter shaft journaled in said gear box, beveled gears connecting said counter shaft to said front axle drive shaft, chain and sprocket gearing connecting said counter shaft to said rear axle drive shaft, and transmission gearing for connecting said counter shaft to said motor, substantially as described.

7. In a motor vehicle, the combination with a frame, of a motor thereon, front and rear axles provided with traction wheels, a gear box mounted upon said front axle and having a vertical swiveled connection therewith, a reach secured to said rear axle and vertically pivoted to said front axle, a horizontal, rear axle drive shaft journaled in said reach, a short, vertical, front axle, drive shaft journaled in said gear box, a horizontal counter shaft journaled in said gear box, gearing connecting said counter shaft to said front and rear axle drive shafts, suitable means including a flexible shaft for connecting said counter shaft to said motor and supporting springs interposed between said gear box and the frame and between said rear axle and the frame, substantially as described.

8. In a motor vehicle, the combination with a frame, a motor mounted thereon, of front and rear axles provided with traction wheels, a support wherein said front axle is centrally and vertically swiveled, supporting springs interposed between said support and said frame and between said rear axle and said frame, a steering gear for said front axle, a reach connected to said rear axle and pivotally connected to said front axle, a horizontal drive shaft for said rear axle journaled in said reach, a short vertical drive shaft for said front axle journaled in said support in line with the axis of oscillation of said front axle, a counter shaft journaled in said support, flexible connections between said counter shaft and said motor, and gearing connecting said counter shaft to said front and rear axle drive shafts, substantially as described.

JOHN H. FITCH.

Witnesses:
C. F. OLMSTEAD,
HANNIBAL YAKES.